(12) United States Patent
Yagisawa et al.

(10) Patent No.: US 11,372,181 B2
(45) Date of Patent: Jun. 28, 2022

(54) OPTICAL MODULE

(71) Applicant: Fujitsu Optical Components Limited, Kawasaki (JP)

(72) Inventors: Takatoshi Yagisawa, Kawasaki (JP); Tsuyoshi Gamo, Machida (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/245,883

(22) Filed: Apr. 30, 2021

(65) Prior Publication Data

US 2021/0389535 A1 Dec. 16, 2021

(30) Foreign Application Priority Data

Jun. 12, 2020 (JP) .............................. JP2020-102362

(51) Int. Cl.
*H04B 10/00* (2013.01)
*G02B 6/42* (2006.01)

(52) U.S. Cl.
CPC ........... *G02B 6/4277* (2013.01); *G02B 6/426* (2013.01); *G02B 6/4246* (2013.01)

(58) Field of Classification Search
CPC combination set(s) only.
See application file for complete search history.

(56) References Cited

U.S. PATENT DOCUMENTS

| 6,366,380 B1* | 4/2002 | Chesavage | G02B 6/4277 398/117 |
| 6,457,874 B1* | 10/2002 | Clapp, Jr. | G02B 6/4292 439/577 |
| 6,994,478 B1* | 2/2006 | Chiu | G02B 6/4292 385/88 |
| 7,013,088 B1* | 3/2006 | Jiang | G02B 6/4214 398/139 |
| 10,534,147 B2* | 1/2020 | Ozaki | G02B 6/4283 |
| 10,948,670 B2* | 3/2021 | Mizuseki | G02B 6/4246 |
| 2005/0018972 A1* | 1/2005 | Anderson | G02B 6/4286 385/53 |
| 2005/0185882 A1* | 8/2005 | Zack | G02B 6/4256 385/15 |

(Continued)

FOREIGN PATENT DOCUMENTS

| JP | 2008-249856 | 10/2008 |
| JP | 2013-142815 | 7/2013 |

*Primary Examiner* — Agustin Bello
(74) *Attorney, Agent, or Firm* — Staas & Halsey LLP (57) ABSTRACT

An optical module includes: a housing formed of a conductor that is insertable and removable with respect to an opening portion of an apparatus; a substrate arranged in an internal space of the housing; and a blocking unit that divides the internal space in which the substrate is arranged into two spaces. The blocking unit includes: a first conductor pattern formed on one surface of the substrate; a second conductor pattern formed on another surface of the substrate; a plurality of vias that penetrate through the substrate and connect the first conductor pattern and the second conductor pattern; a first auxiliary member formed of a conductor that comes into contact with the first conductor pattern and the housing; and a second auxiliary member formed of a conductor that comes into contact with the second conductor pattern and the housing.

5 Claims, 5 Drawing Sheets

(56) References Cited

U.S. PATENT DOCUMENTS

| | | | |
|---|---|---|---|
| 2008/0080819 A1* | 4/2008 | Tien | G02B 6/43 |
| | | | 385/89 |
| 2008/0145060 A1* | 6/2008 | Nelson | G02B 6/4201 |
| | | | 385/94 |
| 2008/0219626 A1* | 9/2008 | Durrant | G02B 6/4204 |
| | | | 385/88 |
| 2008/0240171 A1 | 10/2008 | Izumi et al. | |
| 2008/0240717 A1* | 10/2008 | Izumi | H04B 10/40 |
| | | | 398/79 |
| 2008/0298041 A1* | 12/2008 | Teo | G02B 6/4246 |
| | | | 361/818 |
| 2009/0060519 A1* | 3/2009 | Wang | G02B 6/4201 |
| | | | 398/139 |
| 2011/0228483 A1* | 9/2011 | Togami | G02B 6/4292 |
| | | | 361/714 |
| 2012/0280344 A1* | 11/2012 | Shastri | G02B 6/4257 |
| | | | 257/432 |
| 2019/0094913 A1* | 3/2019 | Hara | G02B 6/4277 |
| 2019/0146167 A1* | 5/2019 | Leigh | G02B 6/4261 |
| | | | 361/715 |
| 2020/0003972 A1* | 1/2020 | Morioka | G02B 6/4239 |
| 2020/0292769 A1* | 9/2020 | Zbinden | G02B 6/4269 |
| 2021/0389535 A1* | 12/2021 | Yagisawa | G02B 6/4246 |

* cited by examiner

OPTICAL MODULE

CROSS-REFERENCE TO RELATED APPLICATION

This application is based upon and claims the benefit of priority of the prior Japanese Patent Application No. 2020-102362, filed on Jun. 12, 2020, the entire contents of which are incorporated herein by reference.

FIELD

The embodiments discussed herein are related to an optical module.

BACKGROUND

In recent years, development of a pluggable optical module that can be inserted in and removed from a rack-type optical transmission apparatus is increasing. The optical module as described above allows the optical transmission apparatus to perform optical transmission by being inserted into a slot that is opened in a front surface of the optical transmission apparatus in a state of being connected to an optical fiber.

Figure 5:
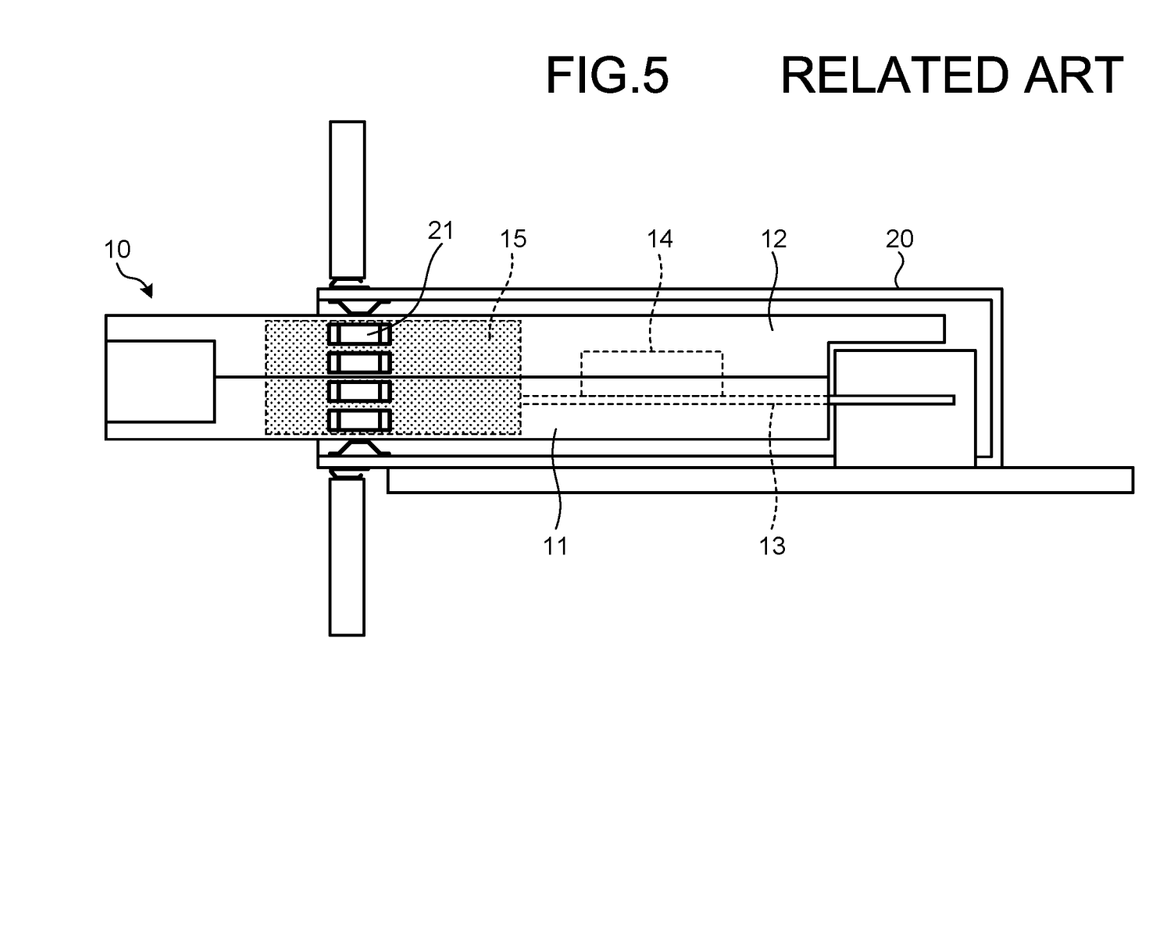
FIG. 5 is a diagram illustrating an example of a configuration of an optical module.

In general, the optical module is compliant with a standard related to electromagnetic interference (EMI), and has a structure that prevents an electromagnetic wave generated by a high-speed component that operates at a high frequency inside the optical module from leaking to the outside of the optical transmission apparatus. Specifically, the optical module has a structure as illustrated in FIG. 5, for example. FIG. 5 is a diagram illustrating a state in which an optical module 10 is inserted in a cage 20 that is opened in a front surface of an optical transmission apparatus, when viewed from a lateral side.

As illustrated in FIG. 5, the optical module 10 is structured such that an outline thereof is formed by a lower housing 11 and an upper housing 12 and various components including a high-speed component 14 is mounted on an internal substrate 13. A distal end of the substrate 13 is plugged into a connector that is arranged on a substrate of the optical transmission apparatus and is connected to the optical transmission apparatus. An electromagnetic wave that is mainly generated by the high-speed component 14 leaks to the outside of the optical module 10 from a gap at a boundary between the lower housing 11 and the upper housing 12. To cope with this, at a position on an inner side of the optical transmission apparatus relative to an opening portion of the cage 20, a radio wave absorbent 15 is supplied to the inside of the optical module 10 to prevent the electromagnetic wave generated by the high-speed component 14 from directly leaking from the optical module 10 to the outside of the optical transmission apparatus. Further, a plurality of gaskets 21 are arranged on an inner surface and an outer surface of the opening portion of the cage 20, and further prevent the electromagnetic wave that has leaked from the optical module 10 to the inside of the optical transmission apparatus from leaking to the outside of the optical transmission apparatus.

Patent Literature 1: Japanese Laid-open Patent Publication No. 2013-142815
Patent Literature 2: U.S. Pat. No. 7,013,088
Patent Literature 3: Japanese Laid-open Patent Publication No. 2008-249856

Meanwhile, in recent years, reduction in size and increase in density of a component included in the optical module are increasing, and a study has been conducted to realize high-speed and long-haul optical communication using a pluggable optical module. However, to increase a speed and a distance of the optical communication, the number of components mounted on the optical module tends to increase and a component mounting area tends to increase, leading to an increase in a size of the substrate.

As a result, in a state in which the optical module is inserted in the optical transmission apparatus, a portion that extends to the outside of the optical transmission apparatus increases, and it becomes difficult to supply a radio wave absorbent to the inside of the optical module at a position corresponding to the inside of the optical transmission apparatus. Therefore, on the outside of the optical transmission apparatus, the electromagnetic wave may directly leak from the gap at the boundary between the lower housing and the upper housing of the optical module to the outside of the optical transmission apparatus.

SUMMARY

According to an aspect of an embodiment, an optical module includes: a housing that is formed of a conductor that is insertable and removable with respect to an opening portion of an apparatus; a substrate that is arranged in an internal space of the housing; and a blocking unit that divides the internal space in which the substrate is arranged into two spaces. The blocking unit includes: a first conductor pattern that is formed on one surface of the substrate; a second conductor pattern that is formed on another surface of the substrate; a plurality of vias that penetrate through the substrate and connect the first conductor pattern and the second conductor pattern; a first auxiliary member that is formed of a conductor and comes into contact with the first conductor pattern and the housing; and a second auxiliary member that is formed of a conductor and comes into contact with the second conductor pattern and the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The present invention is not limited by the embodiment below.

Figure 1:
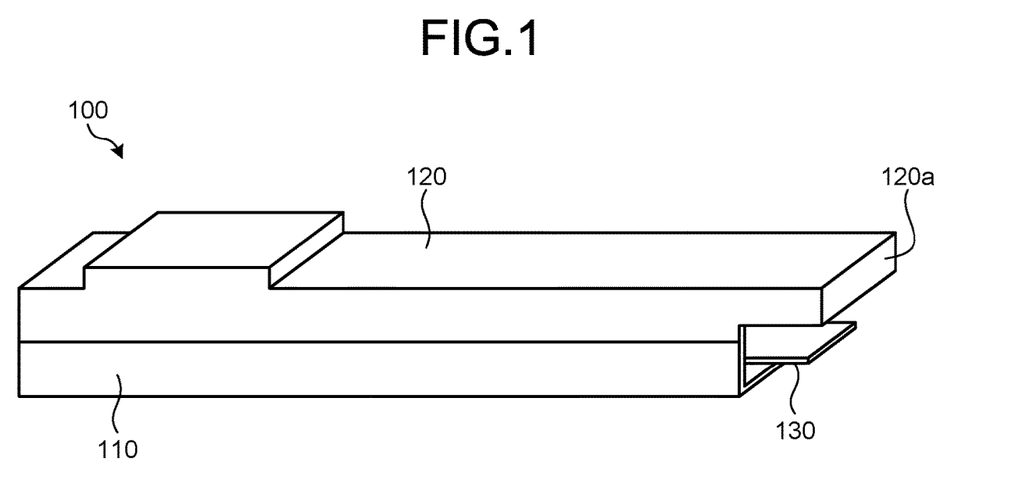
FIG. 1 is a perspective view illustrating a configuration of an optical module according to one embodiment.

FIG. 1 is a perspective view illustrating a configuration of an optical module 100 according to one embodiment. The optical module 100 is a pluggable optical module that has a housing formed of a conductive lower housing 110 and a conductive upper housing 120. A distal end 120a of the upper housing 120 protrudes relative to the lower housing 110, and the optical module 100 is inserted into a cage, which is opened in a front surface of the optical transmission apparatus for example, from the distal end 120a side. Meanwhile, in the following, a direction in which the distal end 120a protrudes will be referred to as a front side of the optical module 100, and a direction opposite to the direction in which the distal end 120a protrudes will be referred to as a rear side of the optical module 100.

A substrate 130 protrudes to the front side relative to the lower housing 110 below the distal end 120a, and if the optical module 100 is inserted into the cage of the optical transmission apparatus, a distal end of the substrate 130 is connected to a connector that is arranged inside the optical transmission apparatus.

The lower housing 110 and the upper housing 120 constitute an outline of the optical module 100 by fitting to each other, but a minute gap is formed at a boundary between the lower housing 110 and the upper housing 120. Therefore, an electromagnetic wave that is emitted from a high-speed component, such as a digital signal processor (DSP), that is mounted on the substrate 130 and that operates at a high frequency may leak from the gap at the boundary between the lower housing 110 and the upper housing 120 to the outside of the optical module 100.

Figure 2A:
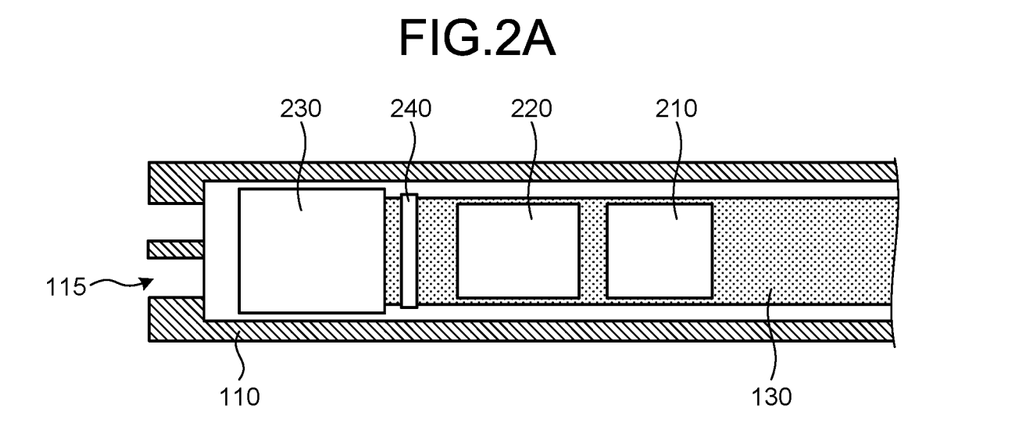
FIGS. 2A and 2B are diagrams illustrating a configuration of a main part of the optical module according to one embodiment.
Figure 2B:
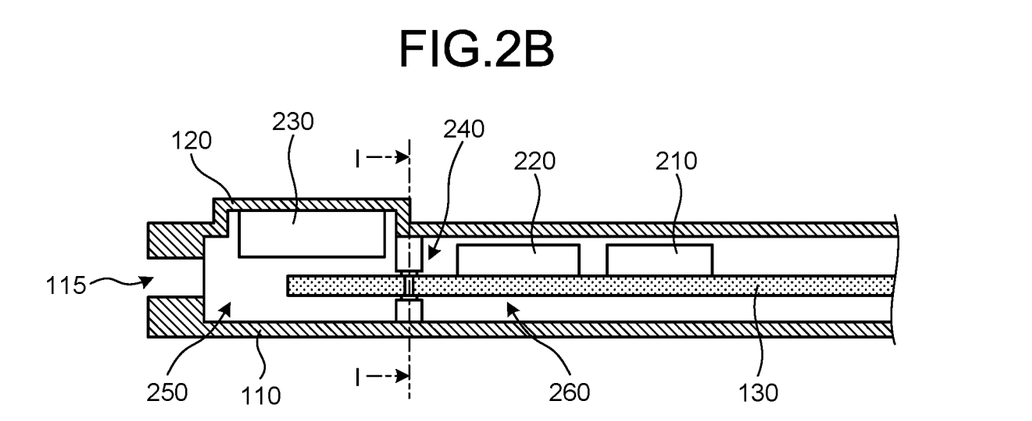

FIGS. 2A and 2B are diagrams illustrating a configuration of a main part of the optical module 100. Specifically, FIG. 2A is a plan view of the inside of the optical module 100 viewed from above, and FIG. 2B is a lateral cross-sectional view of the inside of the optical module 100 viewed from a lateral side. In FIG. 2A and FIG. 2B, illustration of a configuration of the front side of the optical module 100 is omitted.

At a rear end of the optical module 100, a connection portion 115 to which an optical fiber is connectable is formed. If the optical fiber is connected to the connection portion 115, the optical module 100 receives an optical signal from the optical fiber and transmits an optical signal to the optical fiber.

Various components are mounted on the substrate 130 inside the optical module 100. Specifically, for example, components, such as a DSP 210 and a coherent optical subassembly (COSA) 220, are mounted on the substrate 130. The DSP 210 and the COSA 220 are high-speed components that operate at relatively high frequencies, and emit electromagnetic waves. The high-speed components as described above are arranged on the front side relative to a blocking unit 240 that divides an internal space of the optical module 100.

In contrast, for example, an optical component 230 including a light source, such as a laser diode, and a light-detecting element, such as a photodiode, is mounted on the rear side relative to the blocking unit 240. The optical component 230 is a low-speed component that operates at a relatively low frequency, and is less likely to emit an electromagnetic wave. The optical component 230 as described above is arranged on the rear side of the optical module 100, which is located close to the connection portion 115. Meanwhile, low-speed electrical components that do not emit electromagnetic waves may be arranged in addition to the optical component 230 on the rear side relative to the blocking unit 240. The electrical components as described above may be mounted on the substrate 130 that extends to the rear side relative to the blocking unit 240.

In this manner, the internal space formed of the lower housing 110 and the upper housing 120 of the optical module 100 is divided into a rear space 250 and a front space 260 by the blocking unit 240. Further, the low-speed component, such as the optical component 230, that does not emit an electromagnetic wave is arranged in the rear space 250, and the high-speed components, such as the DSP 210 and the COSA 220, that emit electromagnetic waves are arranged in the front space 260.

The blocking unit 240 is configured to block the electromagnetic waves that are emitted from the high-speed components, and prevent the electromagnetic waves emitted from, for example, the DSP 210, the COSA 220, and the like from entering the rear space 250 of the optical module 100. Further, the low-speed component that does not emit an electromagnetic wave is arranged in the rear space 250, so that an electromagnetic wave does not leak from the rear space 250 to the outside of the optical module 100.

Figure 3:
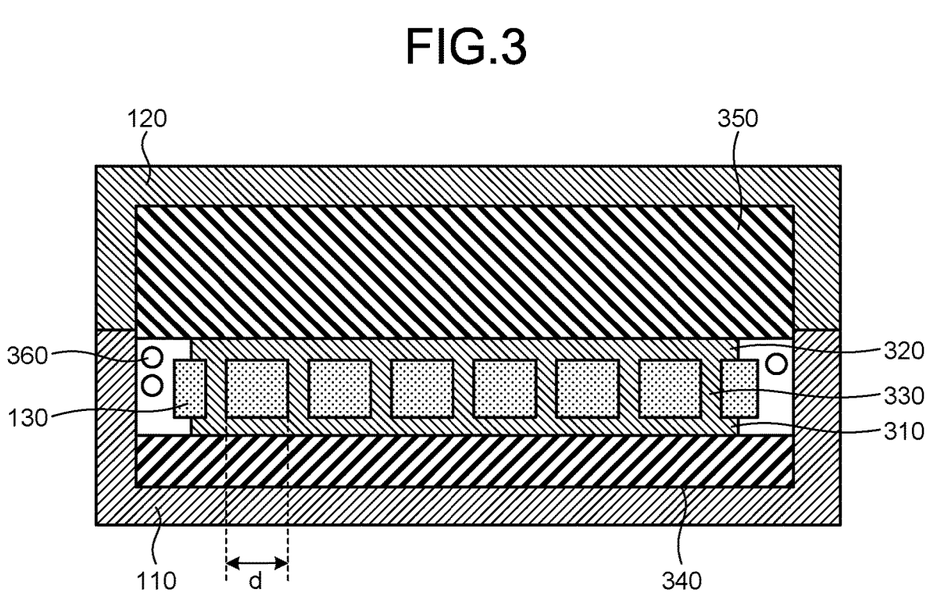
FIG. 3 is a schematic diagram illustrating a cross section cut along a line I-I in FIG. 2B.

FIG. 3 is a diagram illustrating a configuration of the blocking unit 240. Specifically, FIG. 3 is a schematic diagram illustrating a cross section cut along a line I-I in FIG. 2B.

As illustrated in FIG. 3, the blocking unit 240 includes a conductor pattern 310 that is formed on a lower surface of the substrate 130, a conductor pattern 320 that is formed on an upper surface of the substrate 130, a plurality of vias 330 that connect the conductor pattern 310 and the conductor pattern 320, an auxiliary member 340 that connects the conductor pattern 310 and the lower housing 110, and an auxiliary member 350 that connects the conductor pattern 320 and the upper housing 120.

The conductor patterns 310 and 320 are conductor patterns that are the same as wires formed on a surface of the substrate 130, and are independent conductor patterns that are not connected to the wires. The conductor patterns 310 and 320 on the both surfaces of the substrate 130 are connected to each other by the plurality of vias 330 that penetrate through the substrate 130. With this configuration, conductors are arranged in a grid-like manner by the conductor patterns 310 and 320 and the vias 330 in the cross section of the substrate 130.

Each of the auxiliary members 340 and 350 is formed of a conductor, and to connect the conductor pattern 310 and the lower housing 110 and connect the conductor pattern 320 and the upper housing 120, potentials of the conductor patterns 310 and 320, the vias 330, and the auxiliary members 340 and 350, which constitute the blocking unit 240, are set to a potential of a frame ground (FG).

A distance d between the adjacent vias 330 is set in accordance with a frequency of an electromagnetic wave emitted by the high-speed components. Specifically, for example, if the frequency of the electromagnetic wave is equal to or smaller than 50 GHz, the distance d between the vias 330 is set to be equal to or smaller than 3 millimeters (mm). This is because an area enclosed by the conductor patterns 310 and 320 and the adjacent vias 330 is assumed as a single rectangular waveguide, and the distance d is set such that the frequency of the electromagnetic wave becomes equal to a cut-off frequency of the rectangular waveguide.

In other words, a cut-off frequency $f_c$ of a rectangular waveguide with a long side of d (mm) is represented by Expression (1) below.

$$f_c = V_c / 2d \qquad (1)$$

However, in Expression (1), it is assumed that $V_c$ is a light speed ($3.0 \times 10^{11}$ (mm/s)). It can be found that, from Expression (1), the long side d of the rectangular waveguide that blocks the electromagnetic wave at the frequency of 50 GHz or smaller is 3 mm or smaller. Further, a thickness of the substrate 130 is, for example, about 1 mm, which is smaller than 3 mm, so that by setting the distance between the adjacent vias 330 to 3 mm, a plurality of rectangular waveguides each having a long side of 3 mm are formed in the cross section of the substrate 130. As a result, the electromagnetic wave at 50 GHz or smaller emitted by the high-speed components in the front space 260 are blocked by the conductor patterns 310 and 320 and the vias 330 at the potentials of FG, and prevented from propagating through the inside of the substrate 130 and arriving at the rear space 250.

Furthermore, the auxiliary member 340 is arranged between the conductor pattern 310 and the lower housing 110, an upper end of the auxiliary member 340 comes into contact with the conductor pattern 310, and a lower end of the auxiliary member 340 comes into contact with the lower housing 110. Therefore, a lower part of the substrate 130 is blocked, and it is possible to prevent the electromagnetic waves emitted by the high-speed component in the front space 260 from propagating through the lower part of the substrate 130 and arriving at the rear space 250.

Similarly, the auxiliary member 350 is arranged between the conductor pattern 320 and the upper housing 120, a lower end of the auxiliary member 350 comes into contact with the conductor pattern 320, and an upper end of the auxiliary member 350 comes into contact with the upper housing 120. Therefore, an upper part of the substrate 130 is blocked, and it is possible to prevent the electromagnetic waves emitted by the high-speed components in the front space 260 from propagating through the upper part of the substrate 130 and arriving at the rear space 250.

In the blocking unit 240, openings connecting the rear space 250 and the front space 260 are formed on side parts of the substrate 130. The openings allow an optical fiber 360, which is connected to the optical component 230 and extended in a circular manner inside the optical module 100, to pass therethrough. In other words, the optical fiber 360 that is connected to the optical component 230 is arranged, for example, so as to extend to the front space 260 by passing through the opening on one side part of the substrate 130, extend in a circular manner in the front space 260, and return to the rear space 250 by passing through the opening on the other side part of the substrate 130. With this configuration, it is possible to arrange the optical fiber 360 inside the optical module 100 by extending the optical fiber 360 in a circular manner with a curvature radius that meets a predetermined criterion. Meanwhile, the openings on the side parts of the substrate 130 are formed such that sizes in the longitudinal direction are smaller than the distance d between the adjacent vias 330, so that the electromagnetic waves emitted by the high-speed component do not propagate through the openings and do not arrive at the rear space 250.

Furthermore, wires that connect the components in the rear space 250 and the components in the front space 260 are formed in an inner layer of the substrate 130. In other words, the substrate 130 is, for example, a laminated substrate in which the wires are included not only in a surface layer but also in the inner layer, where the inner layer wires crossing the blocking unit 240 electrically connect the electrical components in the rear space 250 and the electrical components in the front space 260.

Next, the way to prevent leakage of an electromagnetic wave when the optical module 100 configured as described above is operated by being inserted in an optical transmission apparatus will be described below.

Figure 4:
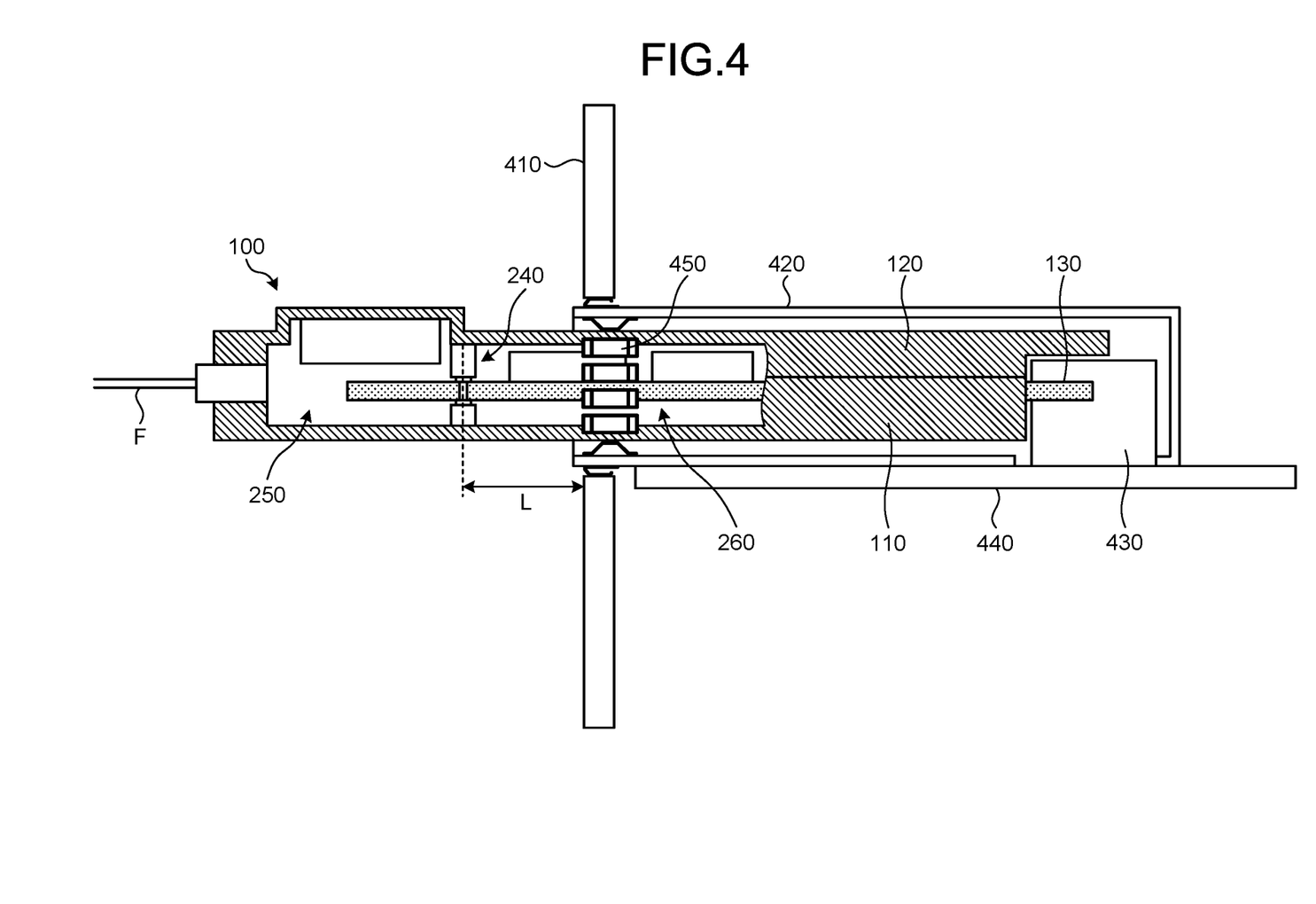
FIG. 4 is a diagram illustrating a state in which the optical module is operated.

FIG. 4 is a diagram illustrating a state in which the optical module 100 is inserted in the optical transmission apparatus when viewed from a lateral side. Specifically, the optical module 100 is inserted in a cage 420 that is opened in a front panel 410 of the optical transmission apparatus. In this case, an optical fiber F is connected to the connection portion 115 at the rear end of the optical module 100. Meanwhile, in FIG. 4, an internal configuration of the optical module 100 is illustrated by cutting parts of the lower housing 110 and the upper housing 120.

If the optical module 100 is inserted in the cage 420, the distal end of the substrate 130 that protrudes to the front side of the optical module 100 is plugged into a connector 430 inside the optical transmission apparatus. The connector 430 is mounted on a circuit substrate 440 of the optical transmission apparatus, and electrically connects a circuit on the substrate 130 of the optical module 100 and a circuit on the circuit substrate 440 of the optical transmission apparatus. With this configuration, the optical transmission apparatus is able to perform optical communication using the optical module 100.

The high-speed components that operate at high frequencies are arranged in the front space 260 of the optical module 100, so that the high-speed components emit electromagnetic waves. The electromagnetic waves leak from the gap at the boundary between the lower housing 110 and the upper housing 120 to the inside of the optical transmission apparatus. However, a plurality of gaskets 450 that protrude from the cage 420 are formed on an outer surface and an inner surface in the vicinity of an opening portion of the cage 420 of the optical transmission apparatus. A gap between the adjacent gaskets 450 is a gap through which the electromagnetic waves does not pass, so that the electromagnetic waves that have leaked from the front space 260 of the optical module 100 to the inside of the optical transmission apparatus do not leak to the outside of the optical transmission apparatus.

In contrast, a number of components are mounted on the substrate 130, so that the front space 260 is extended even to an external portion of the front panel 410 of the optical transmission apparatus. In other words, the blocking unit 240 is located on the outside of the optical transmission apparatus. A distance L from the gaskets 450 to the blocking unit 240 is set to a certain size that prevents passage of the electromagnetic waves emitted by the high-speed components, similarly to the distance d between the plurality of vias 330 that constitute the blocking unit 240. In other words, the blocking unit 240 is located in a range at a certain distance, at which passage of the electromagnetic waves is prevented, from the gaskets 450. Therefore, the size of the gap at the boundary between the lower housing 110 and the upper housing 120 in the area from the gaskets 450 to the blocking unit 240 is a certain size that prevents passage of the electromagnetic waves, so that the electromagnetic waves emitted by the high-speed components do not leak to the outside of the optical transmission apparatus.

Moreover, the electromagnetic waves emitted by the high-speed components in the front space 260 are blocked by the blocking unit 240, so that the electromagnetic waves do not arrive at the rear space 250 and do not leak from the rear space 250 to the outside of the optical transmission apparatus.

As described above, according to the present embodiment, the inside of the optical module is divided into the two spaces by the conductor blocking unit, the high-speed components that emit electromagnetic waves are arranged in the front space, and the low-speed component that does not emit an electromagnetic wave is arranged in the rear space. Therefore, the electromagnetic waves emitted by the high-speed component in the front space are blocked by the blocking unit and do not arrive at the rear space, so that in a state in which the optical module is inserted into optical transmission apparatus from the front space side, the electromagnetic waves do not leak from the rear space that protrudes to the outside of the optical transmission apparatus. Further, the electromagnetic waves that leak from the front space inside the optical transmission apparatus are blocked by the gaskets that are formed in the opening portion of the cage in which the optical module is inserted, and do not leak to the outside of the optical transmission apparatus. In other words, it is possible to prevent leakage of the electromagnetic waves to the outside of the apparatus.

According to one embodiment of the optical module disclosed in the present application, it is possible to prevent leakage of an electromagnetic wave to an outside of an apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
   a housing that is formed of a conductor that is insertable and removable with respect to an opening portion of an apparatus;
   a substrate that is arranged in an internal space of the housing; and
   a blocking unit that divides the internal space in which the substrate is arranged into two spaces, wherein
   the blocking unit includes:
      a first conductor pattern that is formed on one surface of the substrate;
      a second conductor pattern that is formed on another surface of the substrate;
      a plurality of vias that penetrate through the substrate and connect the first conductor pattern and the second conductor pattern;
      a first auxiliary member that is formed of a conductor and comes into contact with the first conductor pattern and the housing; and
      a second auxiliary member that is formed of a conductor and comes into contact with the second conductor pattern and the housing.

2. The optical module according to claim 1, wherein the blocking unit is located in a range at a predetermined distance from a gasket that is formed in the opening portion of the apparatus in a state in which the housing is inserted into the opening portion.

3. The optical module according to claim 1, further comprising:
   a first component that is arranged in a front space relative to the blocking unit in an insertion direction in which the housing is inserted into the opening portion of the apparatus, and that emits an electromagnetic wave; and
   a second component that is arranged in a rear space relative to the blocking unit in the insertion direction and that does not emit an electromagnetic wave.

4. The optical module according to claim 3, wherein the plurality of vias are formed such that a distance between adjacent vias is smaller than a distance corresponding to a frequency of the electromagnetic wave emitted by the first component.

5. The optical module according to claim 3, wherein the blocking unit includes an opening that connects the front space and the rear space.

* * * * *